April 8, 1941.     B. M. DOWNEY     2,238,016
PURIFICATION OF KETONES
Filed June 25, 1940
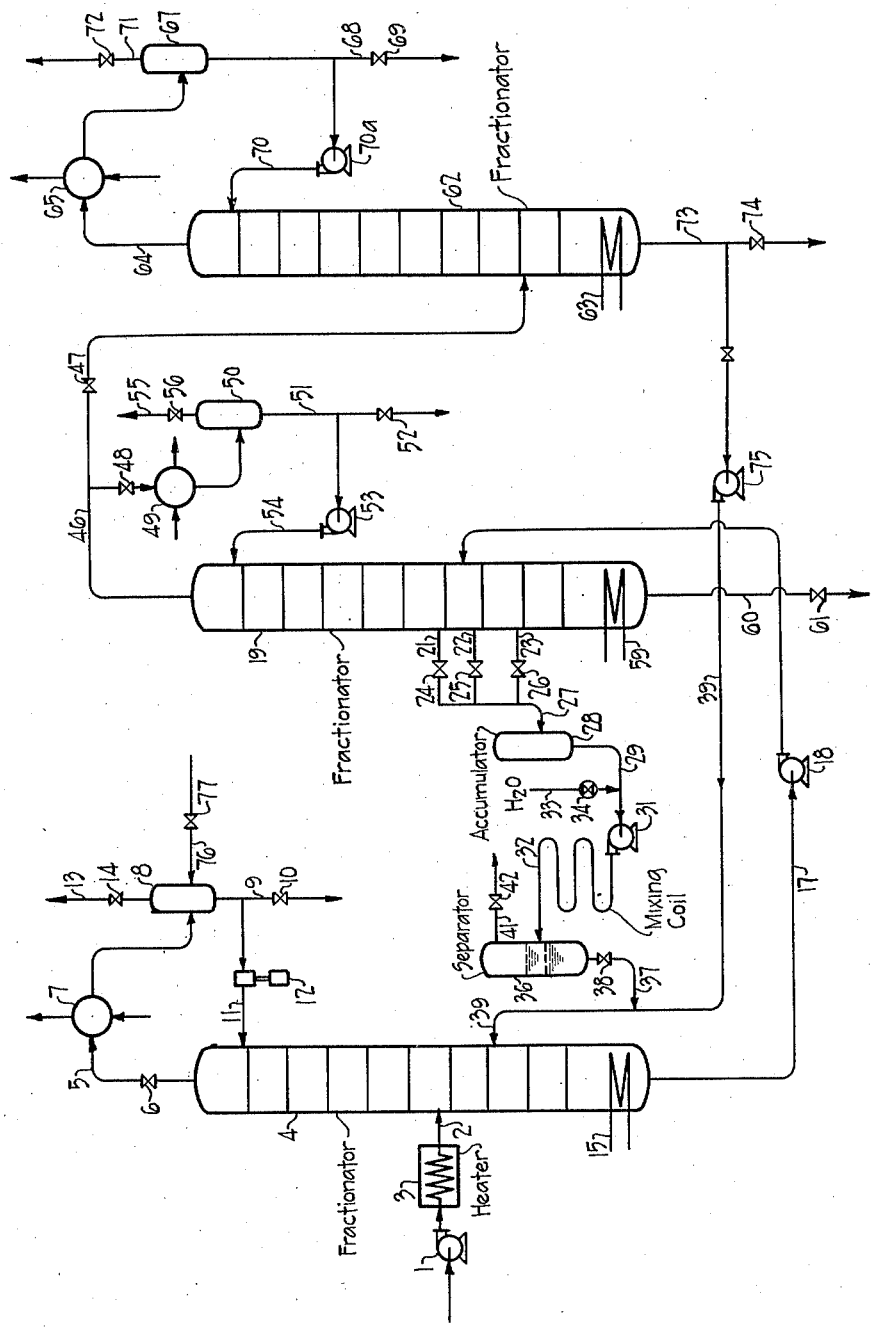
Inventor: Bernard M. Downey
By his Attorney:

Patented Apr. 8, 1941

2,238,016

UNITED STATES PATENT OFFICE 2,238,016

PURIFICATION OF KETONES

Bernard M. Downey, Long Beach, Calif., assignor to Shell Development Company, San Francisco, Calif., a corporation of Delaware Application June 25, 1940, Serial No. 342,277

7 Claims. (Cl. 202—39)

This invention relates to the purification of ketones and deals particularly with a novel method for the purification of crude ketones manufactured from the corresponding secondary alcohols.

In the production of ketones by processes involving the oxidation and/or dehydrogenation of the corresponding alcohols, the product contains substantial quantities of impurities as the result of side reactions. The more usual undesirable side reactions include pyrolytic reactions leading to the formation of aldehydic materials, and decomposition reactions yielding water and olefines, which olefines are polymerized in whole or in part under the usual operating conditions. Since it has been found that minute traces of such olefine polymers will contaminate the final ketone to the extent that it will not meet the specifications set for a commercially desirable product, complete olefine polymer removal is imperative. The nature of the polymer impurity and its tendency to form azeotropes with components of the crude ketone during distillation operations prevent application of the known fractionation procedures to the purification of such polymer-containing crude ketone mixtures without prohibitive losses of the ketone. The purification of crude ketones such as those manufactured from the corresponding secondary alcohols can therefore not be effected in a commercially economical manner in processes disclosed heretofore.

It is an object of the invention to provide a novel process for the economical purification of crude ketone containing impurities comprising higher-boiling organic material such as hydrocarbon polymers capable of forming azeotropes with components of the crude product.

It is a further object of the invention to provide an economical process particularly adapted to the purification on a technical scale of crude ketones manufactured from corresponding secondary alcohols, which crude ketones contain water and organic impurities including aldehydic material, unconverted secondary alcohol and hydrocarbon polymers. Further objects of the invention will become apparent from the following description thereof.

Crude ketones from any suitable source may be advantageously treated and purified by the process of the invention. The process in accordance with the invention is, however, particularly adapted to the purification of crude ketones comprising at least one higher boiling component, such as, for example, a hydrocarbon polymer capable of forming minimum boiling mixtures with other components. Crude ketones comprising these impurities may be obtained, for example, by pyrogenic processes such as the thermal oxidation of hydrocarbons with or without the aid of catalysts. Crude ketones obtained as intermediate products of the controlled oxidation and/or dehydrogenation of secondary alcohols are particularly suitable for purification by the process of the invention. One suitable method for producing such crude ketones from the corresponding secondary alcohols is described, for example, in the United States Patent 1,952,702. The crude ketone forming the starting material for the process may be separated from other reaction products by any suitable methods comprising, for example, distillation, solvent extraction, fractional condensation, adsorption, etc.

In accordance with the process of the invention the crude ketone obtained, for example, from a corresponding secondary alcohol, and containing impurities comprising higher-boiling organic impurities capable of forming azeotropes with other components is subjected to a primary fractionation whereby lighter-boiling impurities such as, for example, aldehydic materials are separated therefrom. The remaining fraction comprising the desired ketone, unconverted alcohol, water, and the higher-boiling impurity is passed into a second fractionating zone. Due to the tendency of the higher-boiling impurity to form azeotropes with other components, it will accumulate to a high concentration in an intermediate part of the second fractionating zone within a relatively short time and thereafter will slough over contaminating the overhead product.

It has been found that the economical separation of the material entering the second fractionating zone into a substantially pure ketone fraction, a fraction comprising the secondary alcohol containing only a small amount of the higher-boiling impurity, and a fraction predominating in the higher-boiling impurity, may be effected by the withdrawal of liquid from the second fractionating zone at a point at or near the vicinity of highest concentration of the higher-boiling impurity. The liquid so withdrawn is treated with a suitable solvent to effect its separation into a fraction predominating in the higher-boiling impurity and a fraction comprising the secondary alcohol and some ketone. The latter fraction is returned to the primary fractionating zone.

Substantially pure ketone taken overhead from the second fractionating zone may be subjected to a third fractionation to further reduce its water content. Bottoms from the third fractionating zone may be recycled to the first fractionating zone.

For the purpose of making my invention more clear it will be described with particular reference to the production of substantially pure acetone from intermediate products containing acetone such as are obtained by the procedure of U. S. Patent 1,952,702. It is to be understood, however, that the process in accordance with the invention is not limited to such application since it is equally advantageous in the purification of other crude ketones such as, for example, crude methyl ethyl ketone, mesityl oxide, acetonyl acetone, cyclohexanone, acetophenone and higher homologues, analogues and substitution products. It will be further evident that similar procedures may be used with mixtures of ketones such as are obtained by the use of secondary alcohol mixtures as starting material.

The attached drawing forming part of this specification is a more or less diagrammatic elevational view of one form of apparatus suitable for carrying out the process of the invention.

A crude ketone, for example, crude acetone obtained by the controlled oxidation of isopropyl alcohol and having the following approximate composition:

| | Per cent by weight |
|---|---|
| Acetone | 47.88 |
| Isopropyl alcohol | 21.66 |
| Water | 30.25 |
| Aldehydic material | 0.02 |
| Hydrocarbon impurities | 0.19 | is drawn from an outside source and forced by means of pump 1 through line 2 into a first fractionating zone. A suitable heating means such as, for example, an indirect heat exchanger 3 may, if necessary, be positioned in line 2.

The first fractionating zone may consist of a column 4 provided with about 30 to 40 practical bubble trays. Within fractionator 4, light materials, comprising aldehydic material and lighter-boiling hydrocarbons, are separated as vapors from the crude ketone. Overhead vapors leave fractionator 4 through line 5, controlled by valve 6, and pass through condenser 7, wherein vapors are condensed, into accumulator 8. Liquid is drawn from accumulator 8 through line 9, controlled by valve 10 and eliminated from the system. A part of the liquid passing through line 9 is forced through line 11 by means of pump 12 into column 4 as reflux. Overhead from column 4 will amount to about 0.4% of the total acetone charged and will have the following approximate composition:

| | Per cent by weight |
|---|---|
| Acetone | 91.6 |
| Aldehydic material | 2.4 |
| Hydrocarbon impurities | 6.0 |

Any suitable means for the recovery of acetone from the overhead product may be resorted to, and the recovered acetone may be returned to the charge. A vent line 13, controlled by valve 14, is connected to the upper part of accumulator 8. Indirect heating means such as a reboiler or a closed coil 15 positioned in the bottom of fractionater 4 is provided to aid in stripping the crude ketone.

Liquid having the following approximate composition:

| | Percent by weight |
|---|---|
| Acetone | 47.8 |
| Isopropyl alcohol | 21.7 |
| Water | 30.3 |
| Hydrocarbon polymers | 0.2 | is drawn from the bottom of fractionator 4 through line 17 and forced by means of pump 18 into a second fractionating zone. The second fractionating zone may suitably consist of a column 19 provided with about 35 to 45 practical bubble trays.

It was found that when carrying out the fractionation in a conventional manner the polymer will accumulate to a concentration of about 12 to 14% at an intermediate point of fractionator 19 within a relatively short period of operation after which time some of the polymer is carried over with the top product. As pointed out above, minute traces of this polymer will contaminate acetone to the extent that it will not pass tests required of a commercially desirable product. Changes in fractionating conditions fail to fractionate this polymer to the extent that it can be removed in the bottom product without prohibitive losses of acetone. Withdrawal of a cut consisting substantially of polymer as a side stream in a conventional manner is found to be impractical due to the tendency of the polymer to form azeotropes with other components present and the difficulty of effecting its separation from acetone within fractionator 19.

In accordance with the process of the invention one or more liquid streams are continuously withdrawn from fractionator 19 at or near the point of highest polymer concentration in the column. Lines 21, 22 and 23 controlled respectively by valves 24, 25 and 26 are provided for such withdrawal. Liquid withdrawn through one or more of lines 21, 22 and 23 is passed through line 27 into accumulator 28.

Liquid comprising polymer, acetone, isopropyl alcohol and water is drawn from accumulator 28 through line 29 and forced by means of pump 31 into a mixing zone. A suitable solvent, drawn from an outside source through line 33, controlled by valve 34, is introduced into line 29 and admixed with the liquid drawn from accumulator 28 prior to its introduction into the mixing zone. A suitable solvent may comprise any solvent capable of effecting the separation of the polymer from the remaining components and may be a solvent for either the polymer or the remaining components. The solvent may suitably be replaced by any suitable agent devoid of solvent properties for the components but capable of effecting substantially complete separation of polymer from the remaining components, for example, by stratification. In the present illustrative example of the operation of the process of the invention, it is found that water is a suitable agent to effect the desired separation. The amount of water introduced may vary widely with the composition of liquid in accumulator 28 and is controlled to effect the substantially complete separation of the polymer component. Proper separation may be effected by the addition of water, for example, in the amount of about 5 to about 15% by volume of liquid withdrawn from accumulator 28. The mixing zone may suitably consist of an elongated zone of restricted cross-sectional area such as, for example, a coil 32. Within coil 32 intimate mixture of the added water and liquid drawn from accumulator 28 is effected.

The aqueous stream is passed from coil 32 into a separating zone. The separating zone may suitably consist of a chamber 36. Within chamber 36 separation of polymer as a supernatant layer from an aqueous layer comprising acetone and isopropyl alcohol is effected. The aqueous layer is drawn from chamber 36 through line 37 controlled by valve 38 and passed through line 39 into fractionator 4. The polymer is withdrawn from chamber 36 through line 41 controlled by valve 42 and eliminated from the system. The polymer withdrawn from the system through line 41 in the present illustrative example had a boiling range from about 75° C. to about 149° C. and comprised a small amount of a low-boiling fraction and a mixture of higher-boiling hydrocarbons. The higher-boiling fraction, about 92% of the polymer withdrawn, appeared to be true polymers of propylene. The polymer was found to form a ternary azeotrope with isopropyl alcohol and water having a boiling point of about 78.8° C. and the following composition:

| | Per cent by weight |
|---|---|
| Isopropyl alcohol | 56.6 |
| Polymer | 29.7 |
| Water | 13.7 |

The rate of withdrawal of liquid through lines 21, 22 and 23 from fractionator 19 will vary with the polymer content of the charge and is controlled to maintain the polymer concentration at the point of highest concentration within fractionator 19 well below the concentration at which danger of carrying polymer over into the overhead product is encountered. The amount of liquid withdrawn will nevertheless be comparatively small and in the present illustrative example will be about 0.2 to about 0.3% of the charge to fractionator 19. Liquid withdrawal from accumulator 28 and polymer separation may be carried out intermittently or continuously.

Agents used to effect the separation of polymer in the separating operation and withdrawn from separator 36 as components of the fraction comprising secondary alcohol and ketone are preferably removed from this fraction prior to its passage to fractionator 4 unless such agents are easily separated with bottom products in fractionator 19.

Overhead from fractionator 19, at a temperature of about 57° C. is passed through line 46 controlled by valve 47 into a third fractionating zone. A part of the vapors in line 46 are diverted through line 48 through condenser 49, wherein vapors are condensed, into accumulator 50. From accumulator 50 liquid is withdrawn through line 51 controlled by valve 52 and eliminated from the system. A part of the liquid drawn through line 51 is forced by means of pump 53 through line 54 into fractionator 19 as reflux. If desired valve 47 may be closed and all of the overhead from fractionator 19 passed to accumulator 50. Accumulator 50 is provided with vent line 55 controlled by valve 56.

Overhead from fractionator 19 will have the following approximate composition:

| | Per cent by weight |
|---|---|
| Acetone | 99.6 |
| Water | 0.4 |
| Isopropyl alcohol | Less than 0.05 |

This product remains free of any determinable amount of polymer impurity throughout the period of operation.

Fractionator 19 is provided with suitable heating means at the lower part thereof such as a reboiler or, for example, a closed heating coil 59 to provide the heat necessary to proper fractionation. Heating means not shown in the drawing may be provided to provide additional heat to liquid flowing through line 17 to fractionator 19.

Liquid is withdrawn from the bottom of fractionator 19 through line 60 controlled by valve 61 and will have the following approximate composition:

| | Per cent by weight |
|---|---|
| Isopropyl alcohol | 36.2 |
| Water | 63.5 |
| Acetone | 0.3 |
| Polymer | 0.2 |

It is seen that the process provides simultaneous separation of a substantially pure acetone and an aqueous isopropyl alcohol fraction comprising a minimum amount of polymer. Separation of the isopropyl alcohol from water and remaining polymer may be carried out in any suitable manner, for example, by a further distillation.

The third fractionating zone may suitably consist of a column 62 provided with about 35 to 45 practical plates and heating means such as a reboiler or, for example, a closed coil 63 to provide heat necessary to the fractionating operation. Within fractionator 62 the water content of the acetone is further reduced. Vapors are withdrawn from fractionator 62 at a temperature of about 57.5° C. through line 64 and are passed into condenser 65 wherein vapors are condensed. From condenser 65 products pass through line 66 into accumulator 67. Liquid is drawn from accumulator 67 through line 68 controlled by valve 69. A part of the liquid passed through line 68 is forced by means of pump 70a through line 70 into fractionator 62 as reflux. Accumulator 67 is provided with vent line 71 controlled by valve 72. Pure anhydrous acetone is withdrawn through line 68 as a final product.

Liquid, comprising acetone and water is drawn from the bottom of fractionator 62 through line 73 controlled by valve 74 and eliminated from the system. A part or all of the liquid passing through line 73 may be forced through line 39 by means of pump 75, into fractionator 4.

If desired reagents, capable of converting impurities in the crude ketone such as, for example, objectionable sulfur compounds, to innoxious impurities or to readily removable products, without substantial destruction of ketone, may be introduced into fractionator 4 by any suitable means not shown in the drawing. Resulting higher-boiling products are readily removed from the system from the lower part of fractionator 19 through line 60, or with the polymer impurity through line 41.

In a modification of the process of the invention aldehydic materials in the crude ketone are resolved into higher-boiling products readily removable from the system by the introduction of suitable reagents into fractionator 4. Suitable reagents comprise hypohalites, or halogens in alkaline solutions, and they may be introduced into fractionator 4 by any suitable means. If desired, a side stream may be drawn from an intermediate part of fractionator 4, treated with the reagent and returned to fractionator 4 by means not shown in the drawing. In a preferred manner of carrying out the modification of the invention, a dilute solution of an alkali-metal hypohalite such as, for example, sodium hypochlorite, is introduced through line 76, controlled by valve 77, into accumulator 9. Liquid drawn from accumulator 9 comprising the added hypohalite and reaction products which may have formed within accumulator 9 as a result of the presence of the reagent, are passed through line 11 into fractionator 4. The reagent is added in amounts not substantially in excess of that required to resolve aldehydic materials such as, for example, acetaldehyde, into products readily removable from the system, comprising, for example, chloroform, sodium formate, sodium chloride and water. It has been found that the hypohalite will react more readily with the aldehyde than the ketone and therefore by judicious addition of the reagent in controlled amounts aldehydic materials are readily resolved into products readily removable from the system in the substantial absence of acetone decomposition. Products resulting from the reaction of the hypohalite and the aldehyde material, comprising the haloform, water, organic and inorganic salts are taken from fractionator 4 together with liquid bottoms and passed therewith through line 17 into fractionator 19. The organic and inorganic salts are eliminated from the lower part of fractionator 19 in the water and isopropyl alcohol withdrawn therefrom through line 60. The haloform, for example, chloroform, due to its azeotropic behavior cannot readily be separated from products in fractionator 19 and will accumulate at an intermediate part of the column whence it is drawn with the polymer side stream through one or more of lines 21, 22 and 23. The haloform will separate with the polymer layer in separator 36 and is eliminated from the system through line 41 together with the polymer.

In carrying out the modified process of the invention substantially all of the liquid collected in accumulator 8 may be returned to fractionator 4 and overhead from fractionator 4 eliminated from the system will consist substantially of lighter hydrocarbons vented through line 13. There is thus achieved a still greater yield of desired acetone since recovery of acetone from aldehydic materials, which would ordinarily require a separate operation, is carried out within the system of the process.

Although my invention is described particularly with respect to the purification of crude ketones it is to be understood that it is in no wise limited in its application to this class of compounds and may be applied generally to the purification of many other crude organic compounds comprising impurities tending to form minimum boiling mixtures during distillation. The process of the invention may be applied, for example, to the purification of crude organic oxy-compounds comprising crude secondary alcohols such as crude isopropyl, secondary butyl, secondary amyl and secondary hexyl alcohols obtained as intermediate products by absorption of the corresponding olefine in a suitable acid absorbing medium; crude polyhydric alcohols, ethers, esters, aldehydes, olefine oxides, etc.

The foregoing detailed description of a preferred embodiment of my invention is presented for the purpose of making the invention more clear and the invention is not to be regarded as limited to the details of operation described nor is it dependent upon the soundness or accuracy of the theories advanced as to the advantageous results attained. The invention is to be regarded as limited only by the terms of the accompanying claims, in which it is my intention to claim all novelty inherent therein as broadly as is possible in view of the prior art.

I claim as my invention:

1. A process for purifying crude ketone containing aldehydic material, a secondary alcohol, water and hydrocarbon polymer higher-boiling than the secondary alcohol and capable of forming minimum boiling mixtures with the secondary alcohol and water comprising, fractionating the crude ketone in a first fractionating zone, withdrawing a vapor fraction comprising aldehydric material from the first fractionating zone, passing bottoms comprising ketone, secondary alcohol, water and hydrocarbon polymer from the first fractionating zone into a second fractionating zone, withdrawing liquid comprising polymer, ketone, water and secondary alcohol as a side stream from an intermediate part of the second fractionating zone, scrubbing said side stream with water to effect the separation of a polymer fraction from an aqueous fraction comprising ketone and secondary alcohol, passing the aqueous fraction into the first fractionating zone, withdrawing substantially pure ketone vapors overhead from the second fractionating zone, and withdrawing bottoms comprising secondary alcohol and water from the second fractionating zone.

2. A process for purifying crude acetone containing aldehydic material, isopropyl alcohol, water and hydrocarbon polymers forming azeotropic mixtures with isopropyl alcohol and water comprising, fractionating the crude acetone in a first fractionating zone, withdrawing vapors comprising aldehydic materials from the first fractionating zone, passing bottoms comprising acetone, isopropyl alcohol, water, and polymers from the first fractionating zone into a second fractionating zone, withdrawing liquid comprising acetone, isopropyl alcohol, water and polymers as a side stream from a part of the second fractionating zone substantially at the point of highest concentration of the polymers in the second fractionating zone, scrubbing the side stream with water to extract acetone and isopropyl alcohol therefrom, passing the extracted acetone and isopropyl alcohol to the first fractionating zone, withdrawing substantially pure acetone vapors overhead from the second fractionating zone, and withdrawing bottoms predominating in isopropyl alcohol and water from the second fractionating zone.

3. Process for separately recovering substantially pure acetone and isopropyl alcohol from crude acetone obtained by the manufacture of acetone from isopropyl alcohol which crude acetone contains lower-boiling hydrocarbons, aldehydic material, isopropyl alcohol, water and higher-boiling hydrocarbons boiling above the boiling point of isopropyl alcohol and forming minimum boiling mixtures with isopropyl alcohol and water comprising, fractionating the crude acetone in a first fractionating zone, withdrawing vapors comprising lower-boiling hydrocarbons and aldehydic material from the first fractionating zone, passing bottoms comprising acetone, isopropyl alcohol, water and higher-boiling hydrocarbons from the first fractionating zone into a second fractionating zone, withdrawing liquid comprising acetone, isopropyl alcohol, water and higher-boiling hydrocarbons from an intermediate part of the second fractionating zone, intimately mixing the side stream with water, separating the diluted side stream into a higher-boiling hydrocarbon fraction and an aqueous fraction comprising acetone and isopropyl alcohol, passing the aqueous fraction into the first fractionating zone, withdrawing substantially pure acetone vapors overhead from the second fractionating zone, withdrawing bottoms predominating in isopropyl alcohol and water from the second fractionating zone and substantially recovering isopropyl alcohol from the bottoms withdrawn from the second fractionating zone.

4. A process for purifying crude acetone containing aldehydic material, isopropyl alcohol, water and hydrocarbon polymer forming minimum boiling mixtures with the isopropyl alcohol and water at distillation temperatures comprising, fractionating the crude acetone in a first fractionating zone, withdrawing vapors comprising aldehydic material from the first fractionating zone, passing liquid bottoms comprising acetone, hydrocarbon polymer, isopropyl alcohol and water from the first fractionating zone into a second fractionating zone, withdrawing a liquid side stream comprising polymer, isopropyl alcohol, water and acetone from an intermediate part of the second fractionating zone, scrubbing the side stream with water to effect the separation of a polymer fraction from an aqueous fraction comprising acetone and isopropyl alcohol, passing the aqueous fraction to the first fractionating zone, withdrawing substantially pure acetone vapors overhead from the second fractionating zone, and withdrawing liquid bottoms comprising isopropyl alcohol and water from the second fractionating zone.

5. A process for purifying crude ketone containing low-boiling hydrocarbons, aldehydic material, secondary alcohol, water and higher-boiling hydrocarbons forming minimum boiling mixtures with the secondary alcohol and water which crude ketone is obtained in the manufacture of ketone from the corresponding secondary alcohol comprising, fractionating the crude ketone in a first fractionating zone, withdrawing vapors comprising low-boiling hydrocarbons and aldehydic material from the first fractionating zone, passing bottoms comprising ketone, secondary alcohol, water and higher-boiling hydrocarbons into a second fractionating zone, withdrawing liquid comprising higher-boiling hydrocarbons, secondary alcohol, ketone and water as a side stream from the second fractionating zone, treating the side stream with water to effect the separation of a higher-boiling hydrocarbon fraction from an aqueous fraction comprising ketone and secondary alcohol, passing the aqueous fraction to the first fractionating zone, withdrawing substantially pure ketone vapors overhead from the second fractionating zone, and withdrawing bottoms predominating in secondary alcohol and water from the second fractionating zone.

6. A process for separately recovering substantially pure ketone and secondary alcohol from crude ketone obtained by the manufacture of ketone from corresponding secondary alcohol which crude ketone contains lower-boiling hydrocarbons, aldehydic material, secondary alcohol, water and higher-boiling hydrocarbons, at least a part of the higher-boiling hydrocarbons boiling above the boiling point of secondary alcohol and forming minimum boiling mixtures with the secondary alcohol and water comprising, fractionating the crude ketone in a first fractionating zone, withdrawing vapors comprising lighter-boiling hydrocarbons and aldehydic material from the first fractionating zone, passing bottoms comprising the ketone, secondary alcohol, water and higher-boiling hydrocarbons from the first fractionating zone into a second fractionating zone, withdrawing liquid comprising ketone, water and higher-boiling hydrocarbons, as a side stream from an intermediate part of the second fractionating zone, scrubbing the side stream with water to extract ketone and secondary alcohol therefrom, passing the extracted ketone and secondary alcohol to the first fractionating zone, withdrawing substantially pure ketone vapors overhead from the second fractionating zone, withdrawing bottoms predominating in secondary alcohol and water from the secondary fractionating zone, and substantially recovering secondary alcohol from the bottoms withdrawn from the second fractionating zone.

7. A process for purifying crude ketone containing low-boiling hydrocarbons, aldehydic material, secondary alcohol, water and higher-boiling hydrocarbons which comprises fractionating the crude ketone in a first fractionating zone, introducing an aqueous solution of an alkali-metal hypohalite into the first fractionating zone in controlled amounts not substantially in excess of that required to react with the aldehydic material thereby producing reaction products comprising a haloform and salts of the alkali-metal, separating a vapor fraction comprising low-boiling hydrocarbons from the products in the first fractionating zone, subjecting the remaining products to fractionation in a second fractionating zone, withdrawing liquid comprising higher-boiling hydrocarbons, haloform, ketone and water as a side stream from the second fractionating zone, treating the side stream with water to effect the separation of a fraction comprising higher-boiling hydrocarbon and haloform from an aqueous fraction comprising ketone and secondary alcohol, passing the aqueous fraction to the first fractionating zone, withdrawing substantially pure ketone vapors overhead from the second fractionating zone, and withdrawing bottoms comprising secondary alcohol, water and salts of the alkali-metal from the second fractionating zone.

BERNARD M. DOWNEY.